Dec. 31, 1929.                G. B. LYNCH ET AL                1,742,040
                              RIVET REMOVING TOOL
                              Filed March 21, 1929
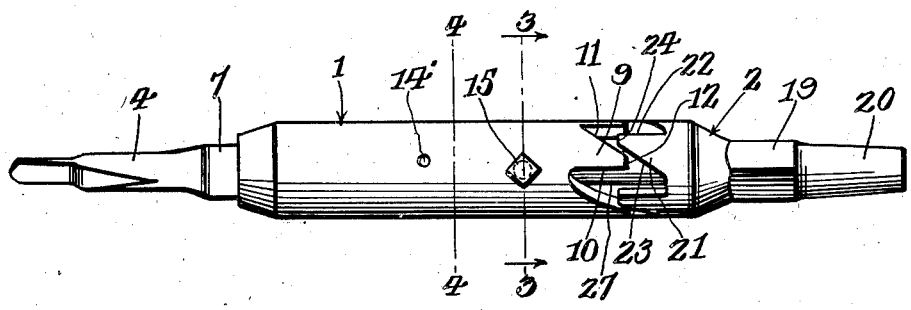
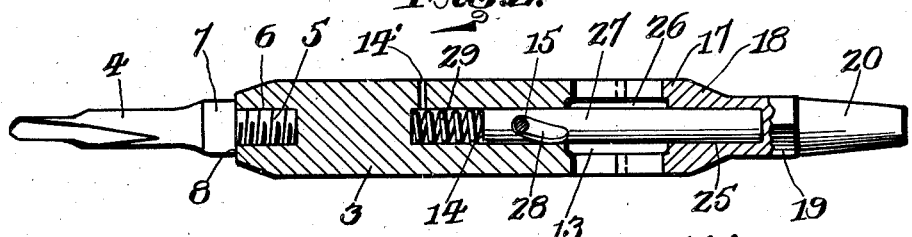
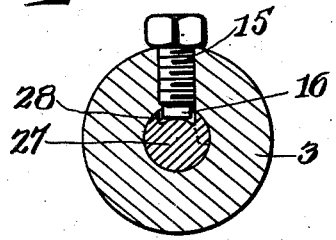
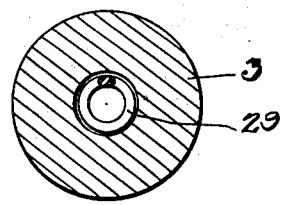
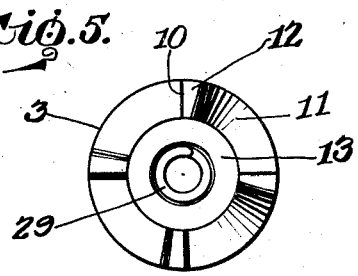
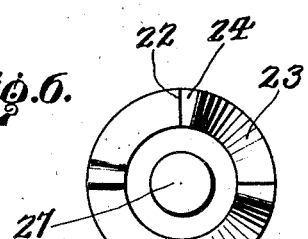
INVENTOR.
George B. Lynch,
BY Glen L. Carroll, and
    Abbie Gumm,
    Geo. P. Kimmel. ATTORNEY.

Patented Dec. 31, 1929

1,742,040

UNITED STATES PATENT OFFICE

GEORGE B. LYNCH, GLEN L. CARROLL, AND ABBIE GUMM, OF TUCSON, ARIZONA

RIVET-REMOVING TOOL.

Application filed March 21, 1929. Serial No. 348,940.

This invention relates to a tool designed primarily for the removal or extraction of stud bolts which have been broken or twisted off in their seats, but it is to be understood that a tool, in accordance with this invention may be employed for any purpose for which it is found applicable, and the invention has for its object to provide, in a manner as hereinafter set forth, a tool for the purpose referred to capable when used for expeditiously removing or extracting broken or twisted off stud bolts from their seats.

A further object of the invention is to provide, in a manner as hereinafter set forth, a tool for the purpose referred to including an intemittently rotatable element for quickly removing or extracting broken or twisted off stud bolts from their seats when occasion requires.

A further object of the invention is to provide, in a manner as hereinafter set forth, a tool for the purpose referred to including a rotatable extractor element and a spring controlled driven element acting upon the extracting element to provide for the intermittent rotation of the latter to expeditiously extract or remove a broken or twisted off stud from its seat when occasion requires.

Further objects of the invention are to provide, in a manner as hereinafter set forth, a tool for the purpose referred to which is simple in its construction and arrangement, strong, durable, conveniently operated, expeditiously performing its function, thoroughly efficient in its use, readily assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a stud extracting tool in accordance with this invention.

Figure 2 is a longitudinal sectional view thereof.

Figure 3 is a section on line 3—3 Figure 1.

Figure 4 is a section on line 4—4 of Figure 1.

Figure 5 is a view looking towards the inner end of the extractor element.

Figure 6 is a view looking towards the inner end of the spring controlled driven element.

A tool for the purpose set forth and in accordance with this invention, includes an extractor element and a reciprocatory spring controlled driven element referred to generally at 1, 2 respectively, and with said elements having coacting interengaging means, to be presently referred to to provide for the intermittent rotation of the extractor element, in an anti-clockwise direction on the movement of the driven element toward the extractor element or the purpose of extracting or removing a broken or twisted off stud bolt from its seat.

The extractor element 1 includes a barrel 3 of any suitable cross section, preferably cylindrical and which constitutes a bit holder. The element 1 further includes a bit 4 of any suitable size or type and of a form provided with a peripherally threaded, cylindrical shank 5 for extension into a socket 5 provided at the outer end of the barrel 3. The wall of the socket 6 is threaded for engagement by the threads of the shank 5 to detachably secure the bit to the barrel. The shank 5 is of reduced diameter with respect to that part 7 of the bit 4 from which the shank 5 extends whereby a shoulder 8 is formed which abuts against the outer end of the barrel 3 when the bit it secured to the latter.

The barrel 3 has formed integral with its inner end a circular row of spaced, substantially triangular shaped teeth 9 of substantial length. The teeth 9 extend lengthwise with respect to the barrel 3 and are flush with the outer periphery of the latter. Each tooth has a straight side 10, an inclined side 11 and a flat outer or free end 12. The row of teeth 9 provide the inner end of the barrel with a recess 13. The barrel 3 is further formed with an axially disposed socket 14 which opens into the recess 13. The barrel 3 is also formed with a vent opening 14' for the socket 14 to prevent an air cushion being formed in the socket 14 to offer resistance to the force applied to the tool. Carried by the barrel 3 and extending in the socket 14 is a guide screw 15 for a purpose to be presently referred to. The inner end of the screw 15 is reduced as at 16.

The reciprocatory element 2 consists of a cylindrical part 17, merging at its outer end into a tapered part 18 which terminates in a polygonal part 19 and the latter merges into a tapered shank 20. Projecting from the inner end of the part 17 is a circular row of substantially triangular shaped, spaced teeth 21 and each includes a straight side 22, an inclined side 23, and a flat outer or free end 24.

The teeth 21 are oppositely disposed with respect to the teeth 9. The teeth 21 operate in the spaces between the teeth 9 and these latter operate in the spaces between the teeth 21. The inclined sides of the teeth 9 are engaged by the inclined sides of the teeth 21, when the element 2 moves towards element 1 to provide for the rotation of the latter to the left.

The section 2 is furthermore provided in the parts 17, 18 and 19 with an axially disposed socket 25 which opens into a recess 26 provided by the teeth 21. Sweated in the socket 25, projecting from part 17 and extending through the recesses 26, 13 and into the socket 14 is a guide stem 27 formed in its periphery with an arcuate groove 28 into which extends the reduced portion 16 of the guide and retaining screw 15.

Mounted in the socket 14 and interposed between the outer end of the stem 27 and spaced from the socket 14 is a coiled spring 29 acting to normally maintain the teeth on element 2 in spaced relation with respect to the teeth on section 1. The movement of element 2 towards element 1 is had against the action of spring 29.

The section 2 is termed the head of the tool and the part 19 thereof is provided for connecting to the head an ordinary hexagonal ratchet wrench. The head is arranged relatively to the wrench so that the shank 20 will extend above the wrench to receive driving blows from a hammer or other tool to force the section 2 towards the section 1 against the action of the spring 29.

A proper sized bit is secured to barrel 3 and is slightly driven into a concavity or recess which has been drilled in the broken bolt. The wrench handle is held in such a manner as to prevent the head of the tool from turning to the right or clockwise. Force is then applied to the section 2 by the use of a hammer. As such force drives the section 2 towards element 1, the teeth 9 to 21 ride against each other, forcing the barrel and bit of the tool to rotate to the left with great force whereby the bolt is partly unscrewed and this action is repeated until the bolt is removed from its seat. The spring 29, groove 28 and screw 15 cause the section 2 to resume its original position with reference to element 1 after the force has been applied to section 2.

It is to be understood that assorted bits, both as to size and type may be used in connection with the tool. Spiked bits could be used for removing broken studs that were loose fitting but inaccessible. Extension rod or rods could be used to permit the tool to be employed in places which are hard to reach with chisels or ordinary tools.

It is thought the many advantages of a tool in accordance with this invention and for the purpose set forth can be readily understood, and although the preferred embodiment of the invention is as illustrated and described, yet it is to be understood that changes in the details of construction can be had which fall within the scope of the invention as claimed.

What we claim is:—

1. A rivet removing tool comprising an extractor element for connection with a stud or rivet to remove the latter, a reciprocatory driven element extending into and slidably and rotatably connected to said extractor element and having a portion projecting from the latter, a spring within the extractor element for normally pressing the driven element outwardly with respect to said other element, said elements having normally spaced, opposed, coacting means of such size and proportion as to sustain a violent impact to provide for the intermittent shifting of the extracting element in an anti-clock-wise direction when the driven element moves towards the extractor element on the successive application of force to the driven element to cause the interengagement of said coacting means against the action of said spring.

2. A rivet removing tool comprising an extractor element for connection with a stud or rivet to remove the latter and provided with a socket extending lengthwise thereof, a reciprocatory driven element provided with a stem extending into said socket, said stem being slidably and rotatably connected to said extractor element, a spring within said socket for normally pressing the driven element outwardly with respect to said other element, and said elements having normally spaced, opposed, coacting means of such size and proportion as to sustain a violent impact to provide for the intermittent shifting of the extractor element when the driven element moves towards the extractor element on the successive application of force to the driven element to cause the interengagement of said coacting means against the action of said spring, said coacting means surrounding said stem.

3. A rivet removing tool comprising an extractor element for connection with a stud or rivet to remove the latter and provided with a socket extending lengthwise thereof, a reciprocatory driven element provided with a stem extending into said socket, said stem slidably and rotatably connected to said extractor element, said driven element projecting from said extractor element, a spring mounted in said socket and bearing against the free end of said stem to normally press said driven element outwardly with respect to said extractor element, and said elements having normally spaced, opposed, coacting means of such size and proportion as to sustain a violent impact to provide for the intermittent shifting of the extractor element when the driven element moves towards the extractor element on the successive application of force to the driven element to cause the interengagement of said coacting means against the action of said spring.

4. A rivet removing tool comprising an extractor element for connection with a stud or rivet to remove the latter and provided with a socket extending lengthwise thereof, a reciprocatory driven element provided with a stem extending into said socket, said stem slidably and rotatably connected to said extractor element, said driven element projecting from said extractor element, a spring mounted in said socket and bearing against the free end of said stem for normally pressing said driven element outwardly with respect to said extractor element, and said elements having normally spaced, opposed, coacting means of such size and proportion as to sustain a violent impact to provide for the intermittent shifting of the extractor element when the driven element moves towards the extractor element on the successive application of force to the driven element to cause the interengagement of said coacting means against the action of said spring, and the said coacting means consisting of two circular rows of triangular shaped teeth, one row carried by the extractor element and the other by the driven element, the teeth carried by the driven element being oppositely disposed with respect to the teeth carried by the extractor element.

5. A rivet removing tool comprising an extractor element for connection with a stud or rivet to remove the latter and provided with a socket extending lengthwise thereof, a reciprocatory driven element extending into said socket and slidably and rotatably connected to said extractor element, said driven element projecting from said extractor element, a spring carried by the extractor element and bearing against the driven element for pressing the latter normally outwardly with respect to the extractor element, and said elements having normally spaced, opposed, coacting means of such size and proportion as to sustain a violent impact to provide for the intermittent shifting of the extractor element when the driven element moves towards the extractor element on the successive outward application of force to the driven element to cause the interengagement of said coacting means against the action of said spring, said coacting means consisting of two circular rows of triangular shaped teeth, one row carried by the extractor element and the other by the driven element, the teeth carried by the driven element being oppositely disposed with respect to the teeth carried by the extractor element.

In testimony whereof, we affix our signatures hereto.

GEORGE B. LYNCH.
GLEN L. CARROLL.
ABBIE GUMM.